UNITED STATES PATENT OFFICE.

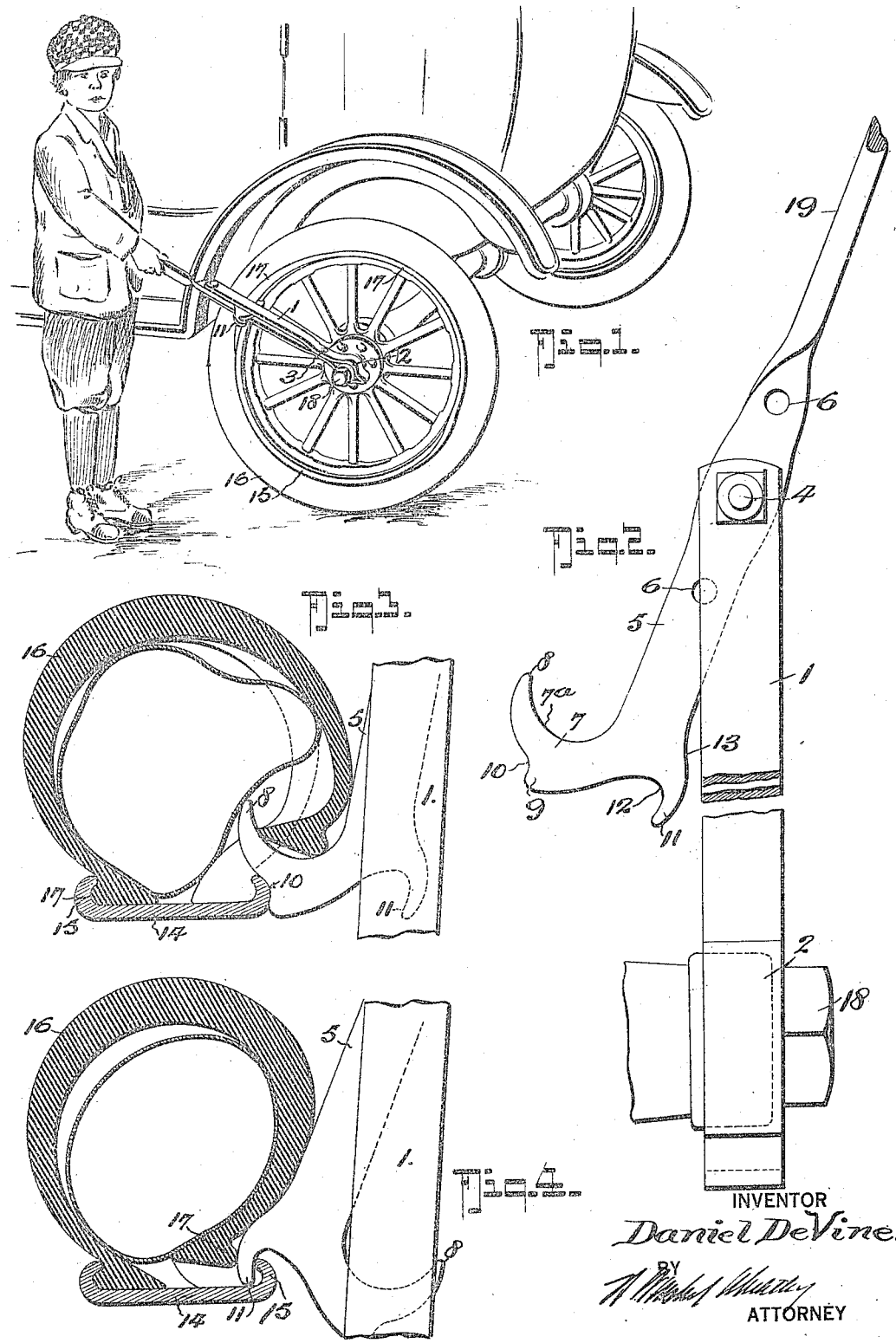

DANIEL DE VINE, OF LOST NATION, IOWA.

TIRE-TOOL.

1,234,141.              Specification of Letters Patent.       Patented July 24, 1917.

Application filed November 6, 1916.   Serial No. 129,853.

*To all whom it may concern:*

Be it known that I, DANIEL DE VINE, residing at Lost Nation, in the county of Clinton and State of Iowa, have invented certain new and useful Improvements in Tire-Tool, of which the following is a specification.

My invention relates to certain new and useful improvements in devices for taking off and replacing clencher tires on their rims and it particularly has for its object to provide a tool for the quick and easy removal and replacement of clencher tires on the ordinary clencher rims.

In its generic nature, the invention consists of an arm having a socket to fit over the hub of the wheel and forming a lever rotatable around the axis of the wheel as a center; mounted on the arm is a tire and rim engaging lever, the lever and arm having an adjustable connection by means of which the tire engaging end of the lever can be brought closer to or farther from the pivotal center of the arm to allow for use of the invention on wheels of different diameters, the lever having a special engaging end for coöperation with the tire and rim.

Another object of the invention is to provide a device of this character of a simple and effective construction which can be easily manipulated and which can be manufactured at a nominal expense.

With other objects in view that will be apparent to those skilled in the art, the invention includes those novel details of construction, combination and arrangement of parts, all of which will be first fully described, then be specifically pointed out in the appended claims and illustrated in the drawings, in which:—

Figure 1 is a perspective view showing the invention in use, the tire being half removed.

Fig. 2 is a side elevation, a part of the arm and lever being broken away.

Fig. 3 is a cross section of a clencher rim and outer shoe of a tire showing the method of applying the device for the purpose of removing the tire from the rim.

Fig. 4 is a view similar to Fig. 3 showing how the device is used to replace the tire on the rim.

In the drawings, in which like numerals and letters of reference indicate like parts in all of the figures, 1 is the arm which has a socket portion 2 to fit over the hub of the wheel (see Fig. 1) and is preferably formed of light strap iron in parallel parts secured together at 3 and spaced apart to permit the introduction of the lever 5 which is secured to the arm 1 at its extremity by a bolt and nut device 4, the arm 5 having a series of bolt holes 6 for adjustment purposes.

7 is the projection of the arm 5 which, it will be noticed, is somewhat in the shape of a "boot" including the toe 8, the heel 9 and the arch 10, the lever having a concaved curvature from the toe 8 to the body of the lever to form a recess 7$^a$ in which the flange 17 of the tire shoe is held during the removal operation.

The lever 5 also includes a hook projection 11 that provides a concaved recess 12 to hook over the rim in applying the device for the purpose of replacing tires on the rim (see Fig. 4) the hook 11 merging with the lever 5 by a concavo convex surface 13, so as to form an easy slideway for the tire shoe to slide off of the convex portion of the hook into place on the rim, as indicated in Fig. 4.

In use, in order to remove the tire, the "foot" 7 is inserted flatwise between the flange 17 of the tire shoe 16 and the rim 14 after which the arm 1 and lever are turned into the radial position, the socket 2 slipped over the hub cap 18 and the handle 19 of the lever is grasped to pull it into alinement with the arm 1, at which time the parts will be in position as shown in Fig. 1, and by turning the implement around the hub cap 18, as a center, the tire will be quickly removed from the rim.

In order to replace the shoe on the rim so that the flange 17 of the shoe will reseat in the flange 15 of the rim, the lever and arm are reversed so as to bring the hook 11 over the rim flange 15, as indicated in Fig. 4 and the implement is again turned around the axis of the wheel, whereupon the shoe will automatically slide back into place on the rim as will be clear to those skilled in the art by an inspection of the drawing.

From the foregoing description taken in connection with the accompanying drawing, it is thought the complete construction, operation and advantages of the invention will be readily understood by those skilled in the art.

What I claim is:

1. A tire tool comprising an arm having a socket to fit over the hub cap of a wheel, a lever pivoted to said arm, said lever having a handle portion and a tire and rim engaging end, said tire and rim engaging end having a tire removing "foot" projection, said tire removing "foot" projection extending laterally from the lever and including a toe portion, a heel portion and an arch portion, the arch portion being designed to engage the tire rim of the wheel, the edge of said "foot" being concaved from the toe portion to the lever to provide a recess for the tire shoe flange during the removal operation.

2. A tire tool comprising an arm having a socket to fit over the hub cap of a wheel, a lever pivoted to said arm, said lever having a handle portion and a tire and rim engaging end, said tire and rim end having a tire removing "foot" projection extended backwardly in the direction toward the lever handle, a forwardly tire replacing hook projection, said tire replacing hook portion extending on the side of the lever opposite to the "foot" portion and including a recess to engage over the flange of the tire rim and a concavo convex surface merging with the lever proper to engage the tire shoe during the replacement portion.

3. A tire tool comprising an arm having a socket to fit over the hub cap of a wheel, a lever pivoted to said arm, said lever having a handle portion and a tire and rim engaging end, said tire and rim engaging end having a tire removing "foot" projection, said tire removing "foot" projection extending laterally from the lever and including a toe portion, a heel portion and an arch portion, the arch portion being designed to engage the tire rim of the wheel, the edge of said "foot" being concaved from the toe portion to the lever to provide a recess for the tire shoe flange during the removal operation, said tire replacing hook portion extending on the side of the lever opposite the "foot" portion and including a recess to engage over the flange of the tire rim and a concavo convex surface merging with the lever proper to engage the tire shoe during the replacement operation.

DANIEL DE VINE.

Copies of this patent may be obtained for five cents each, by addressing the "Commissioner of Patents, Washington, D. C."